United States Patent
Subramanian

(10) Patent No.: US 9,561,766 B2
(45) Date of Patent: Feb. 7, 2017

(54) BUMPER ASSEMBLY

(71) Applicants:MAGNA INTERNATIONAL INC., Aurora, Ontario (CA); Azhagu Subramanian, Sterling Heights, MI (US)

(72) Inventor: Azhagu Subramanian, Sterling Heights, MI (US)

(73) Assignee: Magna International Inc., Aurora, ON (CA)

( * ) Notice: Subject to any disclaimer, the term of this patent is extended or adjusted under 35 U.S.C. 154(b) by 0 days.

(21) Appl. No.: 15/021,951

(22) PCT Filed: Sep. 24, 2014

(86) PCT No.: PCT/US2014/057101
§ 371 (c)(1),
(2) Date: Mar. 15, 2016

(87) PCT Pub. No.: WO2015/048057
PCT Pub. Date: Apr. 2, 2015

(65) Prior Publication Data
US 2016/0221520 A1    Aug. 4, 2016

Related U.S. Application Data

(60) Provisional application No. 61/881,471, filed on Sep. 24, 2013.

(51) Int. Cl.
*B60R 19/00* (2006.01)
*B60R 19/34* (2006.01)
*B60R 19/24* (2006.01)

(52) U.S. Cl.
CPC ............... *B60R 19/34* (2013.01); *B60R 19/24* (2013.01); *B60R 2019/245* (2013.01)

(58) Field of Classification Search
CPC ..... B60R 19/32; B60R 19/34; B60R 2019/245
USPC .................................................. 293/132, 133
See application file for complete search history.

(56) References Cited

U.S. PATENT DOCUMENTS

| | | | |
|---|---|---|---|
| 4,465,312 A | 8/1984 | Werner | |
| 4,509,781 A | 4/1985 | Dick et al. | |
| 4,995,660 A * | 2/1991 | Horansky | B60R 19/26 293/132 |
| 5,150,935 A | 9/1992 | Glance et al. | |
| 5,273,330 A | 12/1993 | Petry et al. | |
| 7,063,364 B2 | 6/2006 | Bird et al. | |

* cited by examiner

Primary Examiner — Joseph D Pape
(74) Attorney, Agent, or Firm — Dickinson Wright PLLC

(57) ABSTRACT

A bumper assembly includes a bumper beam for absorbing an impact of a vehicle and a crash box attached to the bumper beam and extending along an axis A. A mounting plate is attached to the crash box and defines at least one lateral slot extending laterally along the mounting plate in spaced and perpendicular relationship to the axis A. A fastener extends through the lateral slot for mating with a mounting surface of the vehicle frame to establish a secured position of the bumper assembly. The fastener includes a shoulder disposed in abutting relationship with the mounting surface in the secured position to dispose the mounting plate and the mounting surface in spaced relationship to one another for allowing the fastener to slide laterally along the lateral slot during a vehicle impact to reduce the transfer of lateral impact forces from the bumper assembly to the vehicle frame.

20 Claims, 3 Drawing Sheets

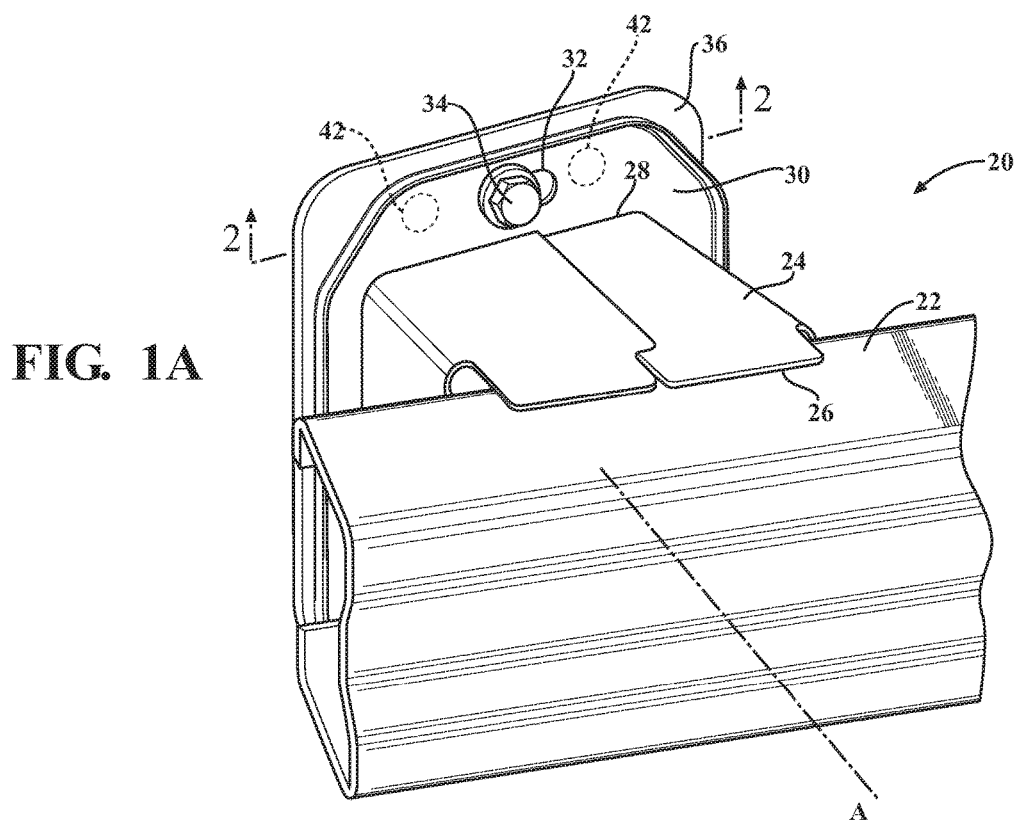
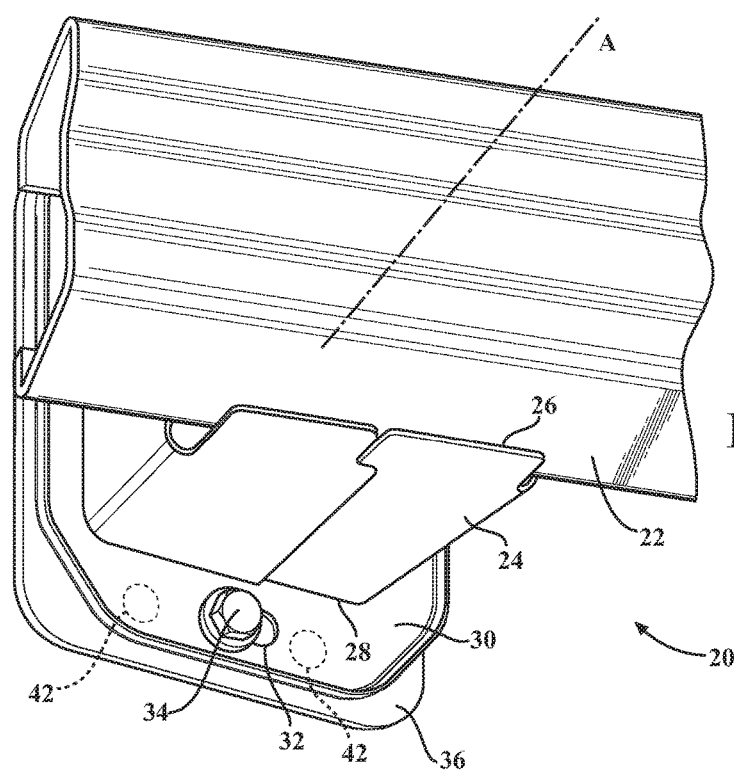

BUMPER ASSEMBLY

CROSS-REFERENCE TO RELATED APPLICATIONS

This U.S. National Stage Patent Application claims the benefit of PCT International Patent Application Serial No. PCT/US2014/057101 filed Sep. 24, 2014 entitled "Bumper Assembly," which claims the benefit of U.S. Provisional Patent Application Ser. No. 61/881,471 filed Sep. 24, 2013, entitled "Bumper Assembly," the entire disclosures of the applications being considered part of the disclosure of this application and hereby incorporated by reference.

BACKGROUND OF THE INVENTION

1. Field of the Invention

The subject invention is related to a vehicle bumper assembly including a bumper beam and a crash box.

2. Description of the Prior Art

Vehicle bumper assemblies are known for providing energy absorbing characteristics to a vehicle, and typically include a bumper beam extending laterally across the front or rear of a vehicle for absorbing a frontal or rear impact. The vehicle bumper assemblies also include crash boxes that are fixedly attached to the bumper beam and which extend along an axis A from the bumper beam. A mounting plate is attached to the crash box and defines at least one orifice for receiving a fastener, such as a bolt, screw, or the like. The fastener extends through the orifice of the mounting plate and mates with a mounting surface of the vehicle frame to establish a fixed and secured position of the bumper assembly to the vehicle frame. In this fixed and secured position, the mounting surface and the mounting plate are disposed in compressed and overlaying relationship to one another, and thus the bumper assembly is not designed to move laterally relative to the vehicle frame during an impact. Rather, the crash boxes of the bumper assembly are designed to fold along the axis A upon the frontal or rear impact of the vehicle to reduce a linear deformation of the vehicle frame along the axis A during a frontal or rear impact of the vehicle.

Although the vehicle bumper assemblies are able to reduce linear deformation of the vehicle frame during an impact of the vehicle, there remains a significant and continuing need for a simple design of a bumper assembly that reduces the transfer of lateral forces, defined relative to the axis A, from the bumper assembly to the vehicle frame and thus improves on the energy absorption properties of the prior art vehicle bumper assemblies. Put another way, there remains a significant and continuing need for a simple design of a bumper assembly that reduces lateral deformation of the vehicle frame during an impact.

SUMMARY OF THE INVENTION

The bumper assembly includes a mounting plate that defines at least one lateral slot extending laterally along the mounting plate in spaced and perpendicular relationship to the axis A. A fastener extends through the lateral slot and includes a shoulder disposed in abutting relationship with the mounting surface of the vehicle frame in the secured position of the bumper assembly to establish a spaced relationship between the mounting surface and the mounting plate. The spaced relationship therebetween allows for the bumper assembly to slide laterally along the lateral slot during an impact of the vehicle. Put another way, the lateral slot in combination with the spaced relationship of the mounting plate and the mounting surface allows the mounting plate, and thus the bumper assembly, to slide laterally relative to the vehicle frame during an impact of the vehicle. As a result, the transfer of lateral impact forces from the bumper assembly to the vehicle frame are significantly reduced during an impact of the vehicle.

One of the mounting plate or the mounting surface also includes at least one protrusion biased against the other of the mounting plate or the mounting surface in the secured position of the bumper assembly. The biasing forces created by the at least one protrusion on the mounting plate or the mounting surface reduces vibration between the bumper assembly and the vehicle frame during normal operation of the vehicle and also effectually tunes or adjusts the amount of lateral impact forces that are transferred from the bumper assembly to the vehicle frame during an impact of the vehicle.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 1A is a top perspective view of a bumper assembly in a secured position relative to a vehicle frame illustrating at least one lateral slot extending laterally along a mounting plate and at least one protrusion extending from a mounting surface of the vehicle frame;

FIG. 1B is a bottom perspective view of the bumper assembly of FIG. 1A;

DESCRIPTION OF THE ENABLING EMBODIMENT

Figure 2:
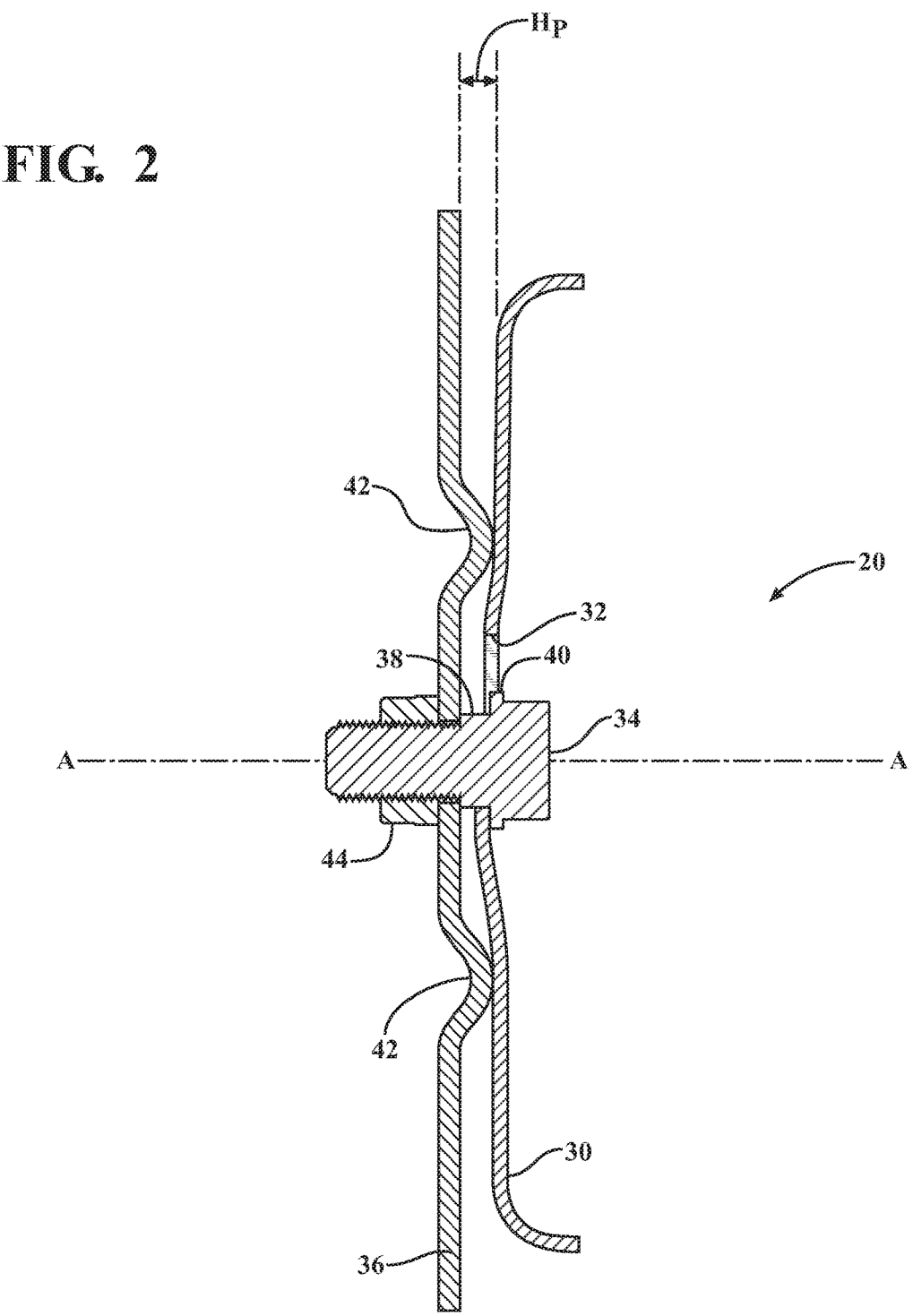
FIG. 2 is a cross-sectional view of FIG. 1A taken along Section A-A.

Referring to the Figures, wherein like numerals indicate corresponding parts throughout the several views, FIG. 1 is a perspective view of a bumper assembly, shown generally at 20, including a bumper beam 22 which typically extends laterally across the front or rear of the vehicle (not shown) for absorbing a vehicle impact. The bumper assembly 20 includes a crash box 24 attached to the bumper beam 22 about a first end 26 and which extends along an axis A to a second end 28. The crash box 24 is designed to fold or collapse upon a frontal or rear impact thereby, along with the bumper beam 22, providing energy absorbing characteristics to the vehicle.

As best shown in FIGS. 1A and 1B, a mounting plate 30 is attached to the second end 28 of the crash box 24 and extends transversely to the axis A. The mounting plate 30 defines at least one lateral slot 32 extending laterally along the mounting plate 30 in spaced and perpendicular relationship to the axis A, and a fastener 34, such as a bolt, screw, or the like, extends through the at least one lateral slot 32 for mating with a mounting surface 36 of the vehicle frame to establish a secured position of the bumper assembly 20. As best shown in FIG. 1A, the at least one lateral slot 32 and fastener 34 includes a first lateral slot 32 and a first fastener 34 each positioned directly above and centered on the crash box 24. However, any other positioning of the first lateral slot 32 and first fastener 34 could be utilized without departing from the scope of the subject disclosure. Further, as best shown in FIG. 1B, the at least one lateral slot 32 can include an additional second lateral slot 32 positioned directly below and centered on the crash box 24. Similar to the description above, a second fastener 34 extends through the second lateral slot 32 for mating with the mounting surface 36 of the vehicle frame to establish the secured position of the bumper assembly 20. Once again, any other positioning of the second lateral slot 32 and second bolt 34 could be utilized without departing from the scope of the subject disclosure. Additionally, any number of lateral slots and bolts could be utilized without departing from the scope of the subject disclosure.

Figure 3:
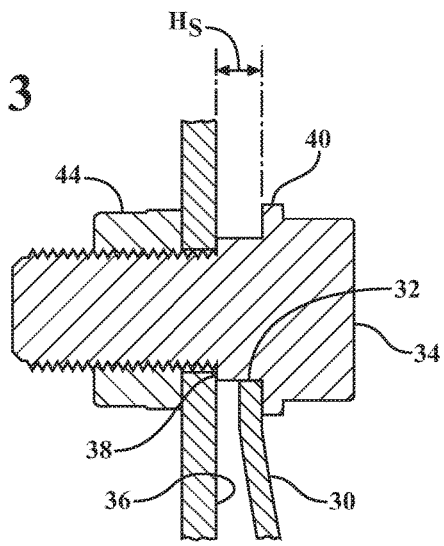
FIG. 3 is a magnified cross-sectional view of a portion of the bumper assembly in the secured position illustrating a fastener including a shoulder disposed in abutting relationship with the mounting surface.

As best shown in FIG. 3, the fastener 34 includes a shoulder 38 having a shoulder height $H_s$ disposed in abutting relationship with the mounting surface 36 in the secured position to establish a spaced relationship between the mounting plate 30 and the mounting surface 36. As also best shown in FIG. 3, the fastener 34 includes a lip 40 disposed in abutting relationship with the mounting plate 30 to maintain the spaced relationship once the secured position of the bumper assembly 20 to the vehicle frame is established. As best shown in FIG. 3, in the preferred embodiment the fastener 34 comprises a shoulder bolt.

As discussed above, the spaced relationship between the mounting plate 30 and the mounting surface 36 allows the fastener 34 to slide laterally along the at least one lateral slot 32 during the impact of the vehicle and thus reduces the transfer of lateral impact forces, defined relative to the axis A, from the bumper assembly 20 to the vehicle frame. Put another way, the at least one lateral slot 32 in combination with the spaced relationship of the mounting plate 30 and the mounting surface 36 allows the mounting plate 30, and thus the bumper assembly 20, to slide laterally relative the vehicle frame during an impact of the vehicle. As a result, the transfer of lateral impact forces from the bumper assembly 20 to the vehicle frame are significantly reduced.

As best shown in FIG. 1A, FIG. 1B and FIG. 2, one of the mounting plate 30 of the bumper assembly 20 or the mounting surface 36 of the vehicle frame includes at least one protrusion 42, such as a dimple, bead, or the like, extending therefrom that has a protrusion height $H_p$ being greater than the shoulder height $H_s$ to dispose the at least one protrusion 42 in abutting relationship with and biased against the other of the mounting plate 30 or the mounting surface 36 in the secured position of the bumper assembly 20. As best shown in FIG. 2, when the mounting surface 36 of the vehicle frame includes the at least one protrusion 42, the lip 40 of the fastener 34 counteracts the biasing forces of the at least one protrusion 42 to bend or deform the mounting plate 30 in the secured position of the bumper assembly 20. As best shown in FIG. 1A, in a preferred arrangement, the at least one protrusion 42 includes a pair of first protrusions 42 disposed above the crash box 24 in radially spaced relationship to one another on opposite sides of the first lateral slot 32 and the first fastener 34. As best shown in FIG. 1B, in a preferred arrangement, the at least one protrusion 42 also includes an additional pair of second protrusions 42 disposed below the crash box 24 in radially spaced relationship to one another on opposite sites of the second lateral slot 32 and the second fastener 34.

As best shown in FIG. 3, in the secured position of the bumper assembly 20, the fastener 34 mates with a nut 44, such as a projection welded nut, that is disposed behind or attached to the backside of the mounting surface 36 of the vehicle frame. Thus, although not expressly shown, in the alternative arrangement such that the mounting plate 30 includes the at least one protrusion 42, the nut 44 counteracts the biasing forces of the at least one portrusion 42 to bend or deform the mounting surface 36 in the secured position. In either arrangement, the biasing forces of the at least one protrusion 42 on the mounting plate 30 or the mounting surface 36 act to reduce vibration between the bumper assembly 20 and the vehicle frame during normal operation of the vehicle.

Figure 4:
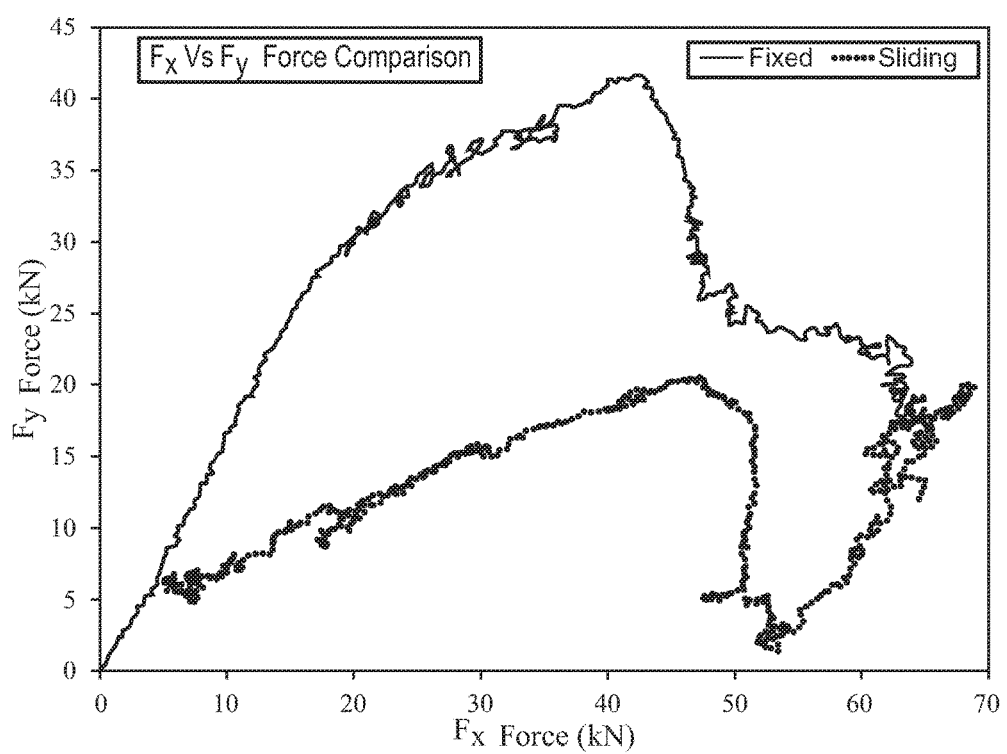
FIG. 4 is a chart illustrating an exemplary reduction of lateral forces that result from the subject bumper assembly.

The at least one protrusion 42 is also used to effectually tune or adjust the amount of lateral impact forces that are transferred from the bumper assembly 20 to the vehicle frame. For example, the amount of lateral forces transferred to the vehicle frame during any impact of the vehicle can be controlled by varying the relationship between the shoulder height $H_s$ and the protrusion height $H_p$, with the amount of transferred lateral forces being inversely proportional to the difference between these respective heights $H_s$, $H_p$. As discussed above, the protrusion height $H_p$ is greater than the shoulder height $H_s$, and in the preferred embodiment this difference is equal to approximately 2 mm. Further, as best shown in FIG. 4, this 2 mm difference between the shoulder height $H_s$ and the protrusion height $H_p$ leads to approximately a 50% reduction in the transfer of lateral forces from the bumper assembly 20 to the vehicle frame when compared to a traditional fixed, or non-sliding, securement of the bumper assembly to the vehicle frame.

In the preferred embodiment, the shoulder height can range between about 2-10 mm and the protrusion height can range between about 4-12 mm. In any arrangement of these heights, increasing the difference between the shoulder height $H_s$ and the protrusion height $H_p$ will cause more lateral forces to be transferred from the bumper assembly 20 to the vehicle frame and decreasing the difference between the shoulder height $H_s$ and the protrusion height $H_p$ will cause less lateral forces to be transferred from the bumper assembly 20 to the vehicle frame.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A bumper assembly for mating with a mounting surface of a vehicle frame comprising:
   a bumper beam for absorbing an impact of a vehicle;
   a crash box attached to said bumper beam and extending along an axis A;
   a mounting plate attached to said crash box and defining at least one lateral slot extending laterally along said mounting plate in spaced and perpendicular relationship to said axis A;
   a fastener extending through said at least one lateral slot for mating with a mounting surface of the vehicle frame to establish a secured position of the bumper assembly;
   said fastener including a shoulder disposed in abutting relationship with the mounting surface in said secured position to dispose said mounting plate and said mounting surface in spaced relationship to one another for allowing said fastener to slide laterally along said lateral slot during an impact of the vehicle to reduce the transfer of lateral impact forces from said bumper assembly to the vehicle frame; and one of said mounting plate of said bumper assembly and said mounting surface of the vehicle frame defining at least one protrusion biased against the other of said mounting plate and said mounting surface in said secured position of the bumper assembly for reducing vibration between the bumper assembly and the vehicle frame during normal operation of the vehicle and for tuning the lateral impact forces transferred from the bumper assembly to the vehicle frame during the impact of the vehicle.

2. A bumper assembly as set forth in claim 1 wherein said shoulder has a shoulder height and said at least one protrusion has a protrusion height being greater than said shoulder height.

3. A bumper assembly as set forth in claim 2 wherein said protrusion height is approximately 2 mm greater than said shoulder height.

4. A bumper assembly as set forth in claim 2 wherein said shoulder height is between about 2-10 mm and said protrusion height is between about 4-12 mm.

5. A bumper assembly as set forth in claim 1 wherein said mounting surface of the vehicle frame includes said at least one protrusion.

6. A bumper assembly as set forth in claim 5 wherein said fastener includes a lip disposed in abutting relationship with said mounting plate in said secured position for maintaining the spaced relationship between said mounting plate and said mounting surface and for counteracting the biasing forces of said at least one protrusion.

7. A bumper assembly as set forth in claim 1 wherein said mounting plate includes said at least one protrusion.

8. A bumper assembly as set forth in claim 7 wherein said fastener mates with a nut attached to said mounting surface for maintaining the spaced relationship between said mounting plate and said mounting surface and for counteracting the biasing forces of said at least one protrusion.

9. A bumper assembly as set forth in claim 1 wherein said at least one protrusion comprises a dimple.

10. A bumper assembly as set forth in claim 1 wherein said fastener comprises a shoulder bolt.

11. A bumper assembly as set forth in claim 1 wherein said at least one lateral slot and said fastener are disposed above said crash box.

12. A bumper assembly as set forth in claim 11 wherein said at least one protrusion includes a pair of first protrusions disposed above said crash box in radially spaced relationship to one another on opposite sides of said at least one lateral slot and said fastener.

13. A bumper assembly as set forth in claim 11 wherein said at least one lateral slot includes a second lateral slot disposed below said crash box and said fastener includes a second fastener extending through said second lateral slot for mating with the mounting surface of the vehicle frame to establish the secured position of the bumper assembly.

14. A bumper assembly as set forth in claim 13 wherein said at least one protrusion includes a second protrusion disposed below said crash box in spaced relationship to said second lateral slot and said second fastener.

15. A bumper assembly as set forth in claim 13 wherein said at least one protrusion includes a second pair of protrusions disposed below said crash box in radially spaced relationship to one another on opposite sites of said second lateral slot and said second fastener.

16. A bumper assembly for mating with a mounting surface of a vehicle frame comprising:

a bumper beam for absorbing an impact of a vehicle;

a crash box attached to said bumper beam and extending along an axis A;

a mounting plate attached to said crash box and defining at least one lateral slot extending laterally along said mounting plate in spaced and perpendicular relationship to said axis A;

a fastener extending through said at least one lateral slot for mating with a mounting surface of the vehicle frame to dispose said mounting plate and said mounting surface in spaced relationship to one another and establish a secured position of the bumper assembly; and one of said mounting plate of said bumper assembly and said mounting surface of the vehicle frame defining at least one protrusion disposed in abutting relationship against the other of said mounting plate and said mounting surface in said secured position of the bumper assembly.

17. A bumper assemlby as set forth in claim 16 wherein said fastener includes a shoulder disposed in abutting relationship with said mounting surface to establish said spaced relationship between said mounting plate and said mounting surface.

18. A bumper assembly as set forth in claim 17 wherein said shoulder has a shoulder height and said at least one protrusion has a protrusion height being greater than said shoulder height.

19. A bumper assembly as set forth in claim 18 wherein said protrusion height is approximately 2 mm greater than said shoulder height.

20. A bumper assembly as set forth in claim 19 wherein said shoulder height is between about 2-10 mm and said protrusion height is between about 4-12 mm.

* * * * *